United States Patent [19]
Onorato et al.

[11] Patent Number: 5,945,233
[45] Date of Patent: Aug. 31, 1999

[54] PROCESS FOR PRODUCING POLYBENZIMIDAZOLE PASTES AND GELS FOR USE IN FUEL CELLS

[75] Inventors: Frank J. Onorato, Phillipsburg; Michael J. Sansone, Berkeley Heights; Stuart M. French, Chatham; Faruq Marikar, Westfield, all of N.J.

[73] Assignee: Avents Research & Technologies GmbH & Co. KG, Germany

[21] Appl. No.: 08/895,059

[22] Filed: Jul. 16, 1997

[51] Int. Cl.⁶ .............................. H01M 2/16; H01M 8/10
[52] U.S. Cl. ........................... 429/33; 429/247; 429/134; 525/435
[58] Field of Search ................................ 429/30, 33, 247, 429/134; 525/435

[56] References Cited

U.S. PATENT DOCUMENTS

| | | |
|---|---|---|
| 3,533,879 | 10/1970 | Levine . |
| 4,309,372 | 1/1982 | Sheibley . |
| 4,448,687 | 5/1984 | Wang . |
| 4,598,099 | 7/1986 | Trouw . |
| 4,664,761 | 5/1987 | Zupancic et al. . |
| 4,693,824 | 9/1987 | Sansone . |
| 4,814,399 | 3/1989 | Sansone et al. . |
| 4,868,008 | 9/1989 | Marikar et al. .................. 427/126.1 |
| 4,927,909 | 5/1990 | Wadhwa et al. .................. 528/331 |
| 4,945,156 | 7/1990 | Jenekhe et al. . |
| 5,091,087 | 2/1992 | Calundann et al. . |
| 5,264,542 | 11/1993 | Hughes et al. . |
| 5,277,981 | 1/1994 | Haider et al. . |
| 5,292,469 | 3/1994 | Bowman et al. . |
| 5,525,436 | 6/1996 | Savinell et al. .................. 429/30 |
| 5,599,639 | 2/1997 | Sansone et al. .................. 429/33 |
| 5,693,434 | 12/1997 | Li et al. . |
| 5,723,231 | 3/1998 | Wu et al. .................. 429/203 |

FOREIGN PATENT DOCUMENTS

| | | |
|---|---|---|
| 604883 | 7/1994 | European Pat. Off. . |
| WO92/10527 | 6/1992 | WIPO . |
| WO94/15773 | 7/1994 | WIPO . |
| WO 96/13872 | 5/1996 | WIPO . |
| WO97/23919 | 7/1997 | WIPO . |
| WO98/04008 | 1/1998 | WIPO . |
| WO98/14505 | 4/1998 | WIPO . |

OTHER PUBLICATIONS

Japanese Patent Application No. 3104921, published May 1, 1991.

Japanese Patent Application No. 74004066, published Jan. 30, 1974.

W. Wieczorek et al, "Protonic Hydrogels for Application in Ambient Temperature Fuel Cells", in New Mater. Fuel Cell Syst. I, Proc. Int. Symp., 1$^{st}$ Montreal Canada, pp. 115–127 (Jul. 9–13, 1995).

S. Zecevic et al, "Kinetics of $O_2$ Reduction on a Pt Electrode Covered with a Thin Film of Solid Polymer Electrolyte", *Journal of the Electrochemical Society,* 144(9):2973–2982 (Sep. 9, 1997).

*Primary Examiner*—Maria Nuzzolillo
*Assistant Examiner*—Mark Ruthkosky
*Attorney, Agent, or Firm*—Howson and Howson

[57] ABSTRACT

A method for producing polybenzimidazole (PBI) paste or gel useful in a fuel cell, mixing PBI polymer with a suitable amount of an acid, which permits the polymer to dissolve and form a matrix having a gel-like or paste-like consistency at room temperature.

22 Claims, No Drawings

PROCESS FOR PRODUCING POLYBENZIMIDAZOLE PASTES AND GELS FOR USE IN FUEL CELLS

FIELD OF THE INVENTION

This invention relates to the manufacture of a paste or gel for use as a polymer electrolyte in fuel cell applications.

BACKGROUND OF THE INVENTION

Fuel cells can be configured in numerous ways with a variety of electrolytes, fuels and operating temperatures. For example, fuels such as hydrogen or methanol can be provided directly to the fuel cell electrode. Alternatively, fuels, such as methane or methanol, can be converted to a hydrogen rich gas mixture external to the cell itself and subsequently provided to the fuel cell. Air is the source of oxygen in most fuel cells, although in some applications, the oxygen is obtained by hydrogen peroxide decomposition or from a cryogenic storage system.

Although there are theoretically a limitless number of combinations of electrolyte, fuel, oxidant, temperatures and so on, practical systems include solid polymer electrolyte systems using hydrogen or hydrazine as the fuel source and pure oxygen as the oxidant. Polybenzimidazole (PBI) which has been doped with a strong acid is an example of a suitable solid polymer for use in an electrolyte system.

It is known in the art to imbibe polybenzimidazole (PBI) dense films with a strong acid to make a proton conducting media. Particularly, U.S. Pat. No. 5,525,436, issued Jun. 11, 1996, described a method of doping PBI film with a strong acid, such as phosphoric acid or sulfuric acid, such that a single phase system is formed, i.e., acid is dissolved in the polymer.

Even in view of the advances in the art, the performance, high cost and processability of suitable polymeric electrolyte materials remain important considerations in fuel cell construction with respect to polymeric media for fuel cells. There remains a need in the art for new materials for use in fuel cells.

SUMMARY OF THE INVENTION

In one aspect, the present invention provides a method of preparing a polymeric, preferably PBI, paste or gel for use as an electrolyte in fuel cells. In one embodiment, the method comprises soaking finely divided PBI polymer in a suitable amount of an acid solution which permits the polymer to dissolve and form a matrix having a gel-like or paste-like consistency at room temperature.

In another aspect, the present invention provides a PBI paste or gel, which contains between about 70 to about 99.9% by weight of imbibed acid, which paste or gel is useful in fuel cells. These pastes or gels are prepared by the methods described herein.

In still another aspect, the invention provides a polymeric fabric coated with a PBI paste or gel according to the invention.

In yet another aspect, the invention provides a fuel cell comprising a PBI paste or gel, or coated fabric, according to this invention.

In a further aspect, the present invention provides a polymeric film coated with a PBI paste or gel of the invention.

In a further aspect, the present invention provides a polymeric film coated with a PBI paste or gel of the invention with a second polymeric film forming a sandwich structure.

In still a further aspect, the present invention provides a method for preparing an electrode for use in fuel cells by steps which include coating the electrode with a paste or gel of the invention.

Other aspects and advantages of the present invention are described further in the following detailed description of the preferred embodiments thereof.

DETAILED DESCRIPTION OF THE INVENTION

The present invention provides an improvement over the art in methods of preparing a polymeric paste or gel which contains acid and is useful as an electrolyte in fuel cells, particularly chlorine-resistant fuel cells, and in the preparation of adhesives. Also provided are the pastes or gels prepared by the method of the invention, as well as fabric and film coated thereby, and fuel cells containing the pastes or gels of the invention.

Generally, according to the process of the invention, a polymeric paste or gel is prepared by mixing or soaking a polymeric powder with a suitably large amount of an acid solution which causes the polymer to dissolve and form a matrix having a gel-like or paste-like consistency at room temperature. By "suitably large amount of acid" is meant between about 70% to about 99.9%, by weight, of the polymer-acid solution mixture which forms the paste or gel.

Preferably, the polymer is PBI. PBI is currently preferred because the inventors have found that the basic nature of the PBI polymer causes it to have an affinity for acids, which permits it to retain the acids under extreme conditions. However, one of skill in the art can readily determine other suitable polymers, and desirably, other basic polymers such as e.g., polyaniline and polypyrimidine which swell upon mixture with the acid solutions described herein and form a paste- or gel-like matrix of the invention. These PBI polymers, as well as other polymers useful in the invention, are readily obtained by one of skill in the art. Similarly, other polymeric materials permit production of gel or paste-like matrix of the invention having variances in acid content within the ranges provided herein.

An acid solution useful for addition to the polymer may contain approximately 100% acid, or may contain a suitable acid diluted by or dissolved in a suitable solvent. For example, the acid solution desirably contains between about 5 weight percent (wt %) to about 100 wt % of an acid and up to about 95 wt % solvent. In a currently preferred embodiment, the acid solution contains about 85 wt % acid and 15 wt % water or methanol.

Suitable acids may include, for example, acetic acid, formic acid, nitric acid, hydrochloric acid, phosphoric acid, sulfuric acid, trifluoroacetic acid, triflic acid and mixtures of these acids or mixtures of these acids and phosphoric acid. Currently, the preferred acid is phosphoric acid. However, one of skill in the art may readily select any other suitable acid. The present invention is not limited to the choice of suitable acid, provided that the acid swells the polymer, e.g., PBI, and permits the formation of a matrix.

Currently, the most preferred acid solution contains about 85% by weight phosphoric acid and 15% by weight water. However, as stated above, other suitable acid solution concentrations using other selected acids may be readily determined and selected by one of skill in the art.

The polymer and acid solution may be combined and mixed at room temperature. However, any temperature between the freezing point and boiling point of the acid may be used. Optionally, the mixture is heated to enable it to reach a gel-like or paste-like consistency more rapidly than at room temperature. Desirably, the mixture is heated to between about 50° C. to about 200° C., and more preferably to between about 100° to about 150° C. Suitably, the heating step is performed for between about five minutes to about four hours, and more preferably for about one hour. Upon cooling, the paste or gel matrix of the invention forms.

Thus, the present invention provides a PBI paste or gel. The resulting PBI paste or gel is characterized by containing between 70–99.9% acid, and preferably about 99% acid, by weight. Such a paste or gel is characterized by higher acid loadings and improved electrochemical properties compared to other compositions of the prior art for the same use. For example, the PBI paste or gel of this invention may be characterized by better retention of the acid than the pastes or gels of the prior art (e.g. phosphoric acid and silicon carbide pastes).

The PBI paste or gel of the invention is useful for a variety of purposes, and particularly in coating such materials as fabrics and films. The coated fabrics, and films, as well as the paste or gel, are useful in fuel cells. Desirably, where the paste or gel of the invention is used in fuel cells, it is produced by mixing the polymer and acid, as described above.

Thus, as another aspect, the present invention provides a fabric or film coated with a PBI paste or gel of the invention. Suitable fabrics and films are desirably polymeric. Desirably, the fabric or film is derived from polymers including, but not limited to, polybenzimidazole (PBI) and derivatives thereof, poly(pyridine), poly(pyrimidine), polyimidazoles, polybenzthiazoles, polybenzoxazoles, polyoxadiazoles, polyquinoxalines, polythiadiazoles, and poly(tetrazapyrenes). The presently preferred, and exemplified polymer, is PBI. Once the selected fabric or film is coated according to the invention, it is particularly well suited for use in a fuel cell. These coated fabrics and films may be produced using methods well known to those of skill in the art.

Desirably, the selected polymeric fabric or film is provided with a coating of between 0.1 to 50 $\mu$M of the paste or gel. The coating is applied using conventional means, such as roll coating, knife coating, Gravure coating, brush coating, spray coating, dip coating and other known techniques. General descriptions of these types of coating methods may be found in texts, such as *Modern Coating and Drying Techniques*, (E. Cohen and E. Gutoff, eds; VCH Publishers) New York (1992) and *Web Processing and Converting Technology and Equipment*, (D. Satas, ed; Van Nostrand Reinhold) New York (1984). The manner of coating the fabric or film is not a limitation of this invention.

Alternatively, in one particularly desired embodiment, a fabric of the invention is imbibed with acid according to the method described in the co-pending, co-filed US patent application for "Process for Producing Polybenzimidazole Fabrics for Use in Fuel Cells", which is incorporated by reference. Briefly, acid-imbibed fabric disclosed in that application contains between about 40 to about 95% acid, by weight, and more preferably about 50 to about 75% acid, by weight, of the imbibed fabric. A fabric containing polymeric fiber is utilized to prepare the acid-imbibed fabric. Examples of such polymers include, but are not limited to, polybenzimidazole (PBI), poly(pyridine), poly(pyrimidine), polyimidazoles, polybenzthiazoles, polybenzoxazoles, polyoxadiazoles, polyquinoxalines, polythiadiazoles, poly(tetrazapyrenes), and mixtures of sulfonated, non-sulfonated PBI and/or such polymeric fibers. Currently, the preferred fiber is a PBI fiber, which may be either sulfonated or non-sulfonated. Suitable fabrics are readily available from a variety of commercial sources, and are preferably woven and contain voids between the individual fibers in the fabric. However, knitted or non-woven fabrics which contain voids which permit imbibition of the acid, as described herein, may also be utilized. The fabric is imbibed with acid by soaking it in an appropriate acid solution, optionally in the presence of heat. A more detailed description of the acid-imbibed fabric and its production are provided in the above-reference patent application.

In a further aspect, the present invention provides a polymeric film coated with a PBI paste or gel of the invention as described above, and joined or place adjacent to a second polymeric film, thereby forming a sandwich structure.

The coated fabric or film of the invention, including the "film sandwich" described above, is useful, for example, as the polymer electrolyte in a fuel cell of the invention. Thus, in another embodiment, the invention provides a method of preparing an electrode for use in a fuel cell by coating an electrode with a PBI paste and gel of the invention as described above. Another advantage of this invention is that the PBI paste or gel of the invention is more readily applied to the electrode material than are prior art electrolytes. The invention further provides fuel cells containing the electrodes, fabrics, and films coated with the PBI paste or gel according to the invention.

The following examples illustrate the preferred compositions and methods of the invention, using PBI as the exemplified polymer. These examples are illustrative only and do not limit the scope of the invention.

EXAMPLE 1

An exemplary PBI paste of this invention is prepared as follows. Commercially available PBI polymer (1 g) was added to a solution containing 117 g 85% $H_3PO_4$ and 15%, by weight, water in a slow mixer. The mixture is agitated at a temperature of 100–150° C. to remove residual water until a consistent paste is obtained. The resulting paste or gel contains about 99% acid by weight.

EXAMPLE 2

Another exemplary PBI paste is prepared as follows. PBI polymer (5 g) was added to a solution containing 112 g 85% $HPO_4$ and 15%, by weight, water in a slow mixer. The mixture is agitated at a temperature of 100–150° C. to remove residual water until a consistent paste is obtained. The resulting paste or gel contains about 96% acid by weight.

EXAMPLE 3

PBI gel prepared from Example 1 was slot-coated at room temperature onto a phosphoric acid imbibed PBI fabric. The thickness of the coating was about 25 $\mu$m. A similar coating was applied to a platinum electrode. A membrane electrode assembly was assembled from these materials and a second electrode such that the layers were ordered electrode/gel/fabric/gel/electrode.

EXAMPLE 4

The membrane electrode assembly fashioned in Example 3 was then placed in a fuel cell. Under typical operating conditions at 0.7 volts the resulting current density and power density is approximately 450 milliamperes/cm$^2$ and 315 milliwatts/cm$^2$, respectively.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method for producing a polybenzimidazole (PBI) paste or gel comprising mixing a polymeric PBI powder and an acid solution, whereby the polymeric PBI powder dissolves in the acid and forms a paste or gel matrix having about 70% by weight to about 99.9% by weight acid at room temperature.

2. The method according to claim 1 further comprising heating said mixture.

3. The method according to claim 1 wherein said acid solution comprises an acid and a solvent selected from the group consisting of water and methanol.

4. The method according to claim 3, wherein said acid is present in solution at between 5% by weight to about 100% by weight of said solution.

5. The method according to claim 4, wherein said solvent is present in said solution at between about 0 and about 95% by weight of said solution.

6. The method according to claim 1, wherein said acid is selected from the group consisting of phosphoric acid, acetic acid, formic acid, nitric acid, hydrochloric acid, sulfuric acid, methanesulfonic acid, trifluoroacetic acid, triflic acid and mixtures thereof.

7. The method according to claim 1, wherein the suitable amount of said solution is between about 95 to about 99% of the total weight of said paste or gel mixture.

8. The method according to claim 1, wherein the amount of said PBI in said paste or gel is between about 0.1% to about 30% by weight of said paste or gel mixture.

9. The method according to claim 2 wherein said mixture is heated to between about 50 to 200° C. for a time sufficient for the mixture to form a paste or gel.

10. The method according to claim 9 wherein said time is between 5 minutes to 4 hours.

11. A PBI paste or gel comprising a phosphoric acid solution content of between about 70 to 99.9% by weight and about 0.01 to about 30% by weight, PBI, of the total weight of said paste or gel.

12. A polybenzimidazole (PBI) paste or gel produced by the method comprising the step of mixing a polymeric PBI powder and an acid solution, whereby the polymeric PBI powder dissolves in the acid solution and forms a paste or gel matrix having about 70% by weight to about 99.9% by weight acid at room temperature.

13. A fuel cell comprising a paste or gel, which comprises a phosphoric acid solution content of between about 70 to 99.9% by weight and about 0.01 to about 30% by weight, PBI, of the total weight of said paste or gel.

14. A polymeric fabric or film coated with a paste or gel, which comprises a phosphoric acid solution content of between about 70 to 99.9% by weight and about 0.01 to about 30% by weight, PBI, of the total weight of said paste or gel.

15. The fabric according to claim 14, which has been imbibed with acid prior to coating with said paste or gel.

16. A fuel cell comprising a fabric coated with a paste or gel, which comprises a phosphoric acid solution content of between about 70 to 99.9% by weight and about 0.01 to about 30% by weight, PBI, of the total weight of said paste or gel.

17. A polymeric film coated with a paste or gel, which comprises a phosphoric acid solution content of between about 70 to 99.9% by weight and about 0.01 to about 30% by weight, PBI, of the total weight of said paste or gel.

18. A method of preparing an electrode for use in fuel cells comprising coating said electrode with a paste or gel which comprises a phosphoric acid solution content of between about 70 to 99.9% by weight and about 0.01 to about 30% by weight, PBI, of the total weight of said paste or gel.

19. The method according to claim 3, wherein said acid is present in said solution at about 85% by weight of said solution.

20. The method according to claim 3, wherein said solvent is present in said solution at about 15% by weight of said solution.

21. The method according to claim 9 wherein said mixture is heated in the range of about 100° C. to about 150° C.

22. A method for producing a polybenzimidazole (PBI) paste or gel comprising the steps of mixing a polymeric PBI powder and an acid solution and forming a paste or gel matrix having about 95% by weight to about 99% by weight acid at room temperature.

* * * * *